United States Patent Office 3,729,531
Patented Apr. 24, 1973

3,729,531
VACUOLE-FREE FILAMENTS AND FILMS OF ACRYLONITRILE COPOLYMERS
Carlhans Suling, Odenthal-Hahnenberg, and Heino Logemann, Leverkusen, Germany, assignors to Farbenfabriken Bayer Aktiengesellschaft, Leverkusen, Germany
No Drawing. Filed Mar. 19, 1971, Ser. No. 126,347
Claims priority, application Germany, Mar. 26, 1970, P 20 14 763.1
Int. Cl. C08f 29/56
U.S. Cl. 260—898   13 Claims

ABSTRACT OF THE DISCLOSURE

Vacuole free filaments and films of copolymers of acrylonitrile and vinylidene chloride, which contain 0.1 to 4% of a homopolymer of dimethylacrylamide or of a copolymer of acrylonitrile with dimethyl acrylamide.

Vacuole-Free Filaments and Films of Acrylonitrile Copolymers

This invention relates to vacuole-free filaments and films of acrylonitrile copolymers containing 20 to 80% by weight of vinylidene chloride and/or vinyl chloride.

One of the disadvantages of filaments or films produced from copolymers of acrylonitrile with vinylidene chloride and/or vinyl chloride is that they contain vacuoles. The effect of the vacuoles is that the filaments and films acquire a more or less dull appearance when treated with water or steam at elevated temperatures. Shaped articles such as filaments are inevitably exposed at some stage during processing to the effect of hot water or steam; for example, filaments may be so exposed during stretching and crimping; yarns obtained from them may, for example, be exposed during dyeing; and made-up fabrics will be exposed during washing and ironing. The dulling effect attributable to vacuoles cannot be prevented and is evidently governed to a large extent by the external conditions, i.e. the intensity and the temperature of treatment with water, with the result that the products made up from the filaments and films have a far from uniform appearance.

It has now been found that the development of vacuoles in filaments or films of copolymers of acrylonitrile with 20 to 80% by weight of vinylidene chloride and/or vinyl chloride can be significantly reduced, or even eliminated altogether, providing from 0.1 to 4% by weight, based on the copolymer of acrylonitrile and vinylidene chloride and/or vinyl chloride, of a homopolymer of dimethyl acrylamide or a copolymer of 0 to 80 mol percent of acrylonitrile with dimethyl acrylamide, is added to a spinning solution of the acrylonitrile copolymer and an organic solvent.

Therefore, it is an object of this invention to provide filaments and films of acrylonitrile copolymers with vinylchloride and/or vinylidene chloride that are free of vacuoles or the content of vacuoles of which is at least significantly reduced.

This object is accomplished by a filament and a film of acrylonitrile copolymers, consisting essentially of a mixture of (a) from 99.5 to 96% by weight of a copolymer of acrylonitrile with from 20 to 80% of a comonomer selected from the group consisting of vinyl chloride, vinylidene chloride, and a mixture thereof, and
(b) from 0.5 to 4% by weight of a homopolymer or copolymer of dimethyl acrylamide containing 0 to 80 mol percent of acrylonitrile.

The filaments and films according to the invention are obtained by a process which comprises mixing in a solvent (a) from 99.5 to 96% by weight of a copolymer of acrylonitrile with from 20 to 80% by weight of a comonomer selected from the group consisting of vinyl chloride, vinylidene chloride and a mixture thereof, and
(b) from 0.5 to 4% by weight of a homopolymer or copolymer of dimethyl acrylamide containing 0 to 80 mol percent of acrylonitrile, and processing the solution thus obtained into filaments and films.

The molecular weight of the homopolymer or copolymer (b) added in accordance with the invention can be varied within wide limits. Broadly speaking, polymers with K-values (according to H. Fikentscher, Cellulosechemie 13 (1932), page 58) of from 2 to 100 are effective, although polymers with a K-value of from 25 to 40 are particularly favourable. The required effect can be obtained both with homopolymers of dimethyl acrylamide and with copolymers of 0 to 90 mol percent of acrylonitrile with dimethyl acrylamide, especially those in a molar ratio of 1:1. Optimum activity is governed to a lesser extent by the composition of the basic material for the filaments or the films (component a). It is surprising that, even when added in such small quantities, homopolymers of dimethyl acrylamide or copolymers of dimethyl acrylamide with acrylonitrile should produce such a distinct effect, because a similarly prepared copolymer of, for example, monomethyl acrylamide and acrylonitrile is ineffectual.

Organic solvents suitable for use in the preparation of the spinning solutions of the mixtures according to the invention include the usual polar solvents of polyacrylonitrile, such as dimethyl formamide, dimethyl acetamide, ethylene carbonate, γ-butyrolactone, dimethyl sulphoxide, or hexamethyl phosphoric acid diamide. Acetone and tetrahydrofuran, for example, may also be used as solvents.

Although it is known from DAS 1,059,614, that the addition of from 30 to 5 parts by weight of a homopolymer of an acrylamide or methacrylamide derivative corresponding to the general formula

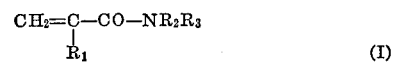

in which $R_1$ represents hydrogen or methyl, and
$R_2$ and $R_3$ represent hydrogen or alkyl with 1 to 6 carbon atoms, or the addition of copolymers comprising at least 50% of these acrylamide or methacrylamide derivatives to 70 to 95 parts by weight of a copolymer of vinylidene chloride or vinyl chloride and acrylonitrile, improves the hydrophilicity and dyeability of filaments and fibres based on the polymer mixtures, it was surprising, and by no means foreseeable as a technical effect, that the addition according to the invention of a very much smaller quantity of the particular dimethyl acrylamide homopolymers and copolymers would be able to stabilise filaments of copolymers of acrylonitrile with vinylidene chloride and/or vinyl chloride against the development of vacuoles. The reason for the effect of these polymers on the development of vacuoles is not known, nor is it exhibited by the described polymers obtained from monomers of general Formula I; it is in fact specific to dimethyl acrylamide homopolymers and dimethyl acrylamide/acrylonitrile copolymers. Whereas the hydrophilicity and dyeability of filaments of copolymers of acrylonitrile with vinylidene chloride and/or vinyl chloride are improved for example by copolymers of acrylamide or methacrylamide derivatives corresponding to the general formula

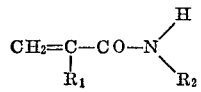
(II)

in which $R_1$ represents hydrogen or methyl, and
$R_2$ represents a lower alkyl radical, these copolymers do not prevent the formation of vacuoles as do the copolymers of acrylonitrile and dimethylacrylamide or dimethyl acrylamide homopolymers, added in accordance with the invention.

Nor do the graft polymers aid graft copolymers of acrylonitrile and acrylamide or methacrylamide derivatives described in United States patent specifications No. 2,620,324; 2,649,434; 2,657,191; 2,776,270 and 2,838,470, corresponding to the general formula

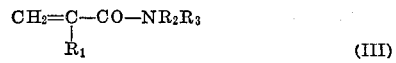
(III)

in which $R_1$ represents hydrogen or methyl, and
$R_2$ and $R_3$ represent hydrogen or alkyl with 1 to 6 carbon atoms, either as such or in the form of additives to fibre-forming acrylonitrile polymers, even in quantities as large as 10%, produce the technical effect which is obtained in accordance with the invention by the addition of the homopolymers or copolymers of dimethyl acrylamide.

The composition of filaments of polymer mixtures used according to the invention differs fundamentally from that of filaments of polymers according to the aforementioned United States patent specifications, in that the filaments according to the invention consist of polymer mixtures which do not contain any graft polymer. Moreover, the technical effect obtainable in accordance with the aforementioned United States patent specifications is not obtained by mixing in the polymers used in accordance with the invention, either as regards the effect on dyeability or as regards the improvement in hydrophilicity. Instead, it has surprisingly been found that, according to the invention, an addition of less than 4% by weight of a copolymer of dimethyl acrylamide with acrylonitrile, or an addition of less than 4% by weight of a homopolymer of dimethyl acrylamide, is sufficient to prevent vacuole formation in filaments and films of copolymers of acrylonitrile with vinylidene chloride and/or vinyl chloride.

Dyeability can be improved, in known manner, if component (a) of the starting material, which is employed in a quantity of at least 96% by weight, comprises a small quantity, i.e. up to 5%, preferably 0.5 to 2% by weight, of a comonomer with acidic or basic groups, for example styrene sulphonic acid, a disulphonimide, vinyl pyridine, dimethylaminoethyl methacrylate, or a sulphobetaine.

The homopolymers and copolymers are tested for their effectiveness as stabilisers against vacuole formation as follows:

Films of the acrylonitrile copolymers with vinylidene chloride and/or vinyl chloride, or of a mixture of acrylonitrile copolymer(a) with copolymer(b), are treated in accordance with the following scheme:

(1) Boiling in water for 1 hour at 100° C.,
(2) Drying for 1 hour at 50° C.,
(3) Tempering for 20 minutes at 140° C.,
(4) Boiling in water for 1 hour at 100° C.

The following results are obtained from tests conducted on a film of a copolymer (a) without the addition of (b):

| Treatment stage: | Appearance of the film |
|---|---|
| 1 | Whitish haze. |
| 2 | Do. |
| 3 | Clear. |
| 4 | Whitish haze. |

When an addition is effective as a substance which prevents vacuole formation, significantly clearer films are obtained as early as in stages 1 and 2, but more particularly on completion of stage 4 of the treatment scheme. Filaments behave in the same way as films.

In the following examples, which are to further illustrate the invention, all percentages are by weight unless otherwise indicated.

The parts by weight relate to parts by volume as kg. to liter.

EXAMPLE 1

Preparation of a dimethyl acrylamide/acrylonitrile copolymer 330 parts by weight of dimethyl acrylamide and 177 parts by weight of acrylonitrile (molar ratio 1:1) are polymerised under nitrogen for 8 hours at 80° C. in 3,300 parts by volume of tert-butanol by means of 13.2 parts by weight of azodiisobutyrodinitrile. The first polymer flakes appear after 25 minutes. After cooling, the product settles at the bottom of the polymerisation vessel in the form of a solid, pale yellowish deposit. The supernatant liquid is run off, the precipitated polymer is washed with a mixture of petroleum ether and tert-butanol (1:1 by volume) and dried in vacuo at 50° C. It is obtained in a yield of 90% and has a K-value of 29.7, as measured in dimethyl formamide at 25° C. Another 5% of polymer having a K-value of 20 can be precipitated from the tert-butanol by petroleum ether.

EXAMPLE 2

10% solution in dimethyl formamide are prepared from a copolymer of 60 parts by weight of acrylonitrile, 40 parts by weight of vinylidene chloride and 1 part by weight of the compound of the formula

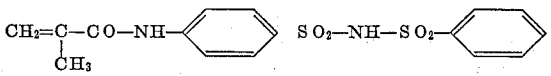

alone and with the addition of 1, 2, 3 and 4% by weight of the copolymer of dimethyl acrylamide and acrylonitrile described in Example 1. Films drawn from these solutions and dried at 50° C. are boiled in water for 1 hour, dried for 1 hour at 50° C., tempered for 20 minutes at 140° C. and then boiled in water again for 1 hour. Dulling is assessed as follows:

| | Film boiled for 1 hour | | Tempered at 140° C. | Boiled for 1 hour |
|---|---|---|---|---|
| | Moist | Dried | | |
| Without any addition | Very white | Very White | Slightly hazy | Very white. |
| With 1% of additive | Very much less white | Slightly hazy | Almost clear | Slightly hazy. |
| With 2% of additive | Even less white | Even less hazy | Minimal hazing | Very slightly hazy. |
| With 3% of additive | Almost clear | Clear | Clear | Clear. |
| With 4% of additive | Clear | do | do | Do. |

In other words, a strong effect is obtained by the addition of even 1% of copolymer according to Example 1.

EXAMPLE 3

Preparation of a dimethyl acrylamide homopolymer 25 parts by weight of dimethyl acrylamide are heated under reflux with slow stirring over a period of 12 hours with 0.5 part by weight of azodiisobutyrodinitrile in 150 parts by volume of tert-butanol. Polymerisation begins after about 30 minutes, the solution becoming thickly liquid. The reaction mixture is then diluted with the same quantity of tert-butanol and precipitated with an excess of petroleum ether. The resulting white powdery precipitate is dried in vacuo at 50° C. The polymer is obtained in a yield of 88% and has a K-value of 45, as measured in dimethyl formamide at 25° C.

EXAMPLE 4

As in Example 2, films are prepared from 10% solutions in dimethyl formamide of a copolymer of 60 parts by weight of acrylonitrile, 40 parts by weight of vinylidene chloride and 1 part by weight of methacryloylaminobenzene/benzene disulphonimide, alone and without the addition of 1 and 4% by weight, respectively, of the homopolymer of dimethyl acrylamide described in Example 3, and then tested for dulling in boiling water. The following results are obtained:

COMPARISON EXAMPLE 1

Preparation of a monomethyl acrylamide/acrylonitrile copolymer 11.2 parts by weight of monomethyl acrylamide and 7 parts by weight of acrylonitrile (molar ratio 1:1) are polymerised under nitrogen for 8 hours at 80° C. in 100 parts by volume of tert-butanol by means of 0.4 part by weight of azodiisobutyrodinitrile. The polymer begins to precipitate after 10 minutes. On completion of precipitation, the fine-grained product is suction-filtered, washed with twice the quantity of a mixture of equal parts by volume of tert-butanol and petroleum ether and then with petroleum ether on its own, and dried in vacuo at 50° C. The mother liquor does not contain any polymeric material which can be precipitated with petroleum ether. A yield of 83% is obtained. The K-value, measured in dimethyl formamide at 25° C., being 71.

COMPARISON EXAMPLE 2

10% solutions in dimethyl formamide are prepared from a copolymer of 60 parts by weight of acrylonitrile, 40 parts by weight of vinylidene chloride and 1 part by weight of methacryloyl aminobenzene-benzene disulphonimide, alone and with additions of 1, 2, 3 and 4% by weight, based on the polymer, of the copolymer of monomethyl acrylamide and acrylonitrile described in Comparison Example 1. Films drawn from these solutions are dried at 50° C., boiled in water for 1 hour at 100° C., dried for 1 hour at 50° C., tempered for 20 minutes at 140° C. and then boiled for another hour in water at 100° C. The dulling of the films is assessed as follows:

|  | Films boiled for 1 hour | | Tempered at at 140° C. | Boiled for 1 hour |
| --- | --- | --- | --- | --- |
|  | Moist | Dried | | |
| Without any addition | Very white | Very white | Slightly hazy | Very white. |
| With 1% of additive | do | do | White | Do. |
| With 2% of additive | do | do | do | Do. |
| With 3% of additive | do | do | do | Do. |
| With 4% of additive | do | do | do | Do. |

The copolymer of monomethyl acrylamide and acrylonitrile does not prevent the films from becoming dull in boiling water; instead it makes them even whiter than they are without the addition after tempering at 140° C.

COMPARISON EXAMPLE 3

Preparation of a monomethyl acrylamide homopolymer 17.2 parts by weight of monomethyl acrylamide are polymerised under nitrogen for 8 hours at 80° C. in 100 parts by volume of tert-butanol by means of 0.4 part by weight of azodiisobutyrodinitrile. A thickly liquid solution is obtained, which is diluted with the same volume of tert-butanol and then precipitated with petroleum ether.

|  | Films boiled for 1 hour | | Tempered at 140° C. | Boiled for 1 hour |
| --- | --- | --- | --- | --- |
|  | Moist | Dried | | |
| Without any addition | Very white | Very white | Still distinctly white | Very white. |
| With 1% of additive | Slightly whitish | Slightly whitish | Still slightly hazy | A little whitish. |
| With 4% of additive | Almost clear | Very slightly whitish | Almost clear | Almost clear. |

Accordingly, although a strong effect is obtained by adding even 1%, it does not quite reach the level, even with an addition of 4%, that is obtained in the case of the copolymer of dimethyl acrylamide with acrylonitrile.

The flakey product is washed with the same volume of a mixture of equal volumes of tert-butanol and petroleum ether, and then with petroleum ether on its own, and dried in vacuo at 50° C. It is obtained in a yield of substantially 100% and has a K-value of 56, measured in dimethyl formamide at 25° C.

COMPARISON EXAMPLE 4

10% solutions in dimethyl formamide are prepared from a copolymer of 60 parts by weight of acrylonitrile, 40 parts by weight of vinylidene chloride and 1 part by weight of methacryloylaminobenzene-benzene disulphonamide, alone and with the addition of 1, 2, 3 and 4% by weight, based on the polymer, of the monomethyl acrylamide homopolymer described in Comparison Example 3. Films drawn from these solutions are dried at 50° C., boiled for 1 hour in water at 140° C., dried for 1 hour at 50° C., tempered for 20 minutes at 140° C., and then boiled in water again for 1 hour at 100° C. The dulling of the films is assessed as follows:

| | Films boiled for 1 hour | | Tempered at at 140° C. | Boiled for 1 hour |
|---|---|---|---|---|
| | Moist | Dried | | |
| Without any addition | Very white | Very white | Slightly hazy | Very white. |
| With 1% of additive | do | do | Whitish | Do. |
| With 2% of additive | do | do | do | Do. |
| With 3% of additive | do | do | do | Do. |
| With 4% of additive | do | do | do | Do. |

The homopolymer of monomethyl acrylamide does not prevent the films from dulling in boiling water, but makes them even whiter in appearance than they are without the addition, even after tempering at 140° C.

We claim:

1. A vacuole-free filament and film of acrylonitrile copolymers, consisting essentially of a mixture of
   (a) from 99.5 to 96% by weight of a copolymer of acrylonitrile with from 20 to 80% of a comonomer selected from the group consisting of vinyl chloride, vinylidene chloride, and a mixture thereof, and
   (b) from 0.5 to 4% by weight of a homopolymer or copolymer of dimethyl acrylamide containing 0 to 80 mol percent of acrylonitrile.

2. The filament and film of claim 1, wherein said component (a) contains up to 5% by weight of a monoolefinically unsaturated comonomer having acidic or basic functional groups.

3. The filament and film of claim 2, wherein said component (a) contains 0.5 to 2% by weight of said comonomer having acidic or basic functional groups.

4. The filament and film of claim 2, wherein said comonomer having acidic or basic functional groups is selected from the group consisting of styrene sulphonic acid, a disulphonimide, vinyl pyridine, dimethylaminoethyl methacrylate and a sulphobetaine.

5. The filament and film of claim 1 wherein said component (b) has a K-value (according to Fikentscher, Cellulosechemie 13 (1932) page 58) of from 10 to 100.

6. Filaments or films as claimed in claim 1 wherein component (b) has a K-value (according to Fikentscher, Cellulosechemie 13 (1932), page 58) of from 25 to 40.

7. A process for the production of vacuole free filaments and films which comprises mixing in a solvent
   (a) from 99.5 to 96% by weight of a copolymer of acrylonitrile with from 20 to 80% by weight of a comonomer selected from the group consisting of vinyl chloride, vinylidene chloride and a mixture thereof and
   (b) from 0.5 to 4% by weight of a homopolymer or copolymer of dimethyl acrylamide containing 0 to 80 mol percent of acrylonitrile, and processing the solution thus obtained into filaments and films.

8. The process of claim 7, wherein said mixing is carried out in a solvent selected from the group consisting of dimethyl formamide, dimethyl acetamide, ethylene carbonate, γ-butyrolactone, dimethyl sulphoxide, hexamethyl phosphoric acid triamide, acetone and tetrahydrofuran.

9. The process of claim 7, wherein said component (a) contains up to 5% by weight of a monoolefinically unsaturated comonomer having acidic or basic functional groups.

10. The process of claim 9, wherein said component (a) contains from 0.5 to 2% by weight of the comonomer having acidic or basic functional groups.

11. The process of claim 9, wherein said comonomer having acidic or basic functional groups is selected from the group consisting of styrene sulphonic acid, a disulphonimide, vinyl pyridine, dimethylaminoethyl methacrylate and a sulphobetaine.

12. The process of claim 7 wherein said component (b) has a K-value (according to Fikentscher, Cellulosechemie 13 (1932), page 58) of from 10 to 100.

13. The process of claim 7, wherein said component (b) has a K-value (according to Fikentscher, Cellulosechemie 13 (1932), page 58) of from 25 to 40.

References Cited

UNITED STATES PATENTS

| 2,831,826 | 4/1958 | Coover et al. | 260—32.8 |
| 3,039,524 | 6/1962 | Belck et al. | 28—82 |
| 3,139,621 | 6/1964 | Stewart | 260—41 |

OTHER REFERENCES

Schildknecht, Vinyl and Related Polymers, pub. 1952, pp. 282–286.

SAMUEL H. BLECH, Primary Examiner

C. J. SECCURO, Assistant Examiner

U.S. Cl. X.R.

264—211; 260—30.4 N, 30.6 R, 30.8 DS, 32.6 N, 32.8 N, 895